United States Patent
Kohn et al.

(10) Patent No.: US 10,237,571 B1
(45) Date of Patent: Mar. 19, 2019

(54) INTER-PREDICTION CANDIDATE SELECTION IN A MODE DECISION

(71) Applicant: Ambarella, Inc., Santa Clara, CA (US)

(72) Inventors: Leslie D. Kohn, Saratoga, CA (US); Peter Verplaetse, Redwood City, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 15/883,209

(22) Filed: Jan. 30, 2018

Related U.S. Application Data

(63) Continuation of application No. 14/745,728, filed on Jun. 22, 2015, now Pat. No. 9,918,102.

(51) Int. Cl.
  *H04N 19/513* (2014.01)
  *H04N 19/52* (2014.01)
  *H04N 19/159* (2014.01)

(52) U.S. Cl.
  CPC .................. *H04N 19/513* (2014.11)

(58) Field of Classification Search
  CPC .... H04N 19/513; H04N 19/52; H04N 19/159; G01N 27/4045
  USPC ............. 375/240.02, 240.12, 240.15, 240.16
  See application file for complete search history.

(56) References Cited

U.S. PATENT DOCUMENTS

| | | | |
|---|---|---|---|
| 6,473,837 B1 * | 10/2002 | Hughes | G06F 9/3834 710/22 |
| 9,172,970 B1 * | 10/2015 | Maaninen | H04N 19/51 |
| 2012/0207212 A1 | 8/2012 | Lin | 375/240.08 |
| 2012/0233405 A1 * | 9/2012 | Budagavi | G06F 12/0844 711/118 |
| 2013/0136181 A1 | 5/2013 | Amitay | 375/240.16 |
| 2015/0055707 A1 * | 2/2015 | Thodiyil | H04N 19/433 375/240.16 |
| 2015/0382012 A1 * | 12/2015 | Hussain | H04N 19/176 375/240.16 |

* cited by examiner

*Primary Examiner* — Christopher S Kelley
*Assistant Examiner* — Kathleen M Walsh
(74) *Attorney, Agent, or Firm* — Christopher P. Maiorana, PC

(57) ABSTRACT

An apparatus includes a first circuit and a second circuit. The first circuit may be configured to (i) fetch a reference samples from a memory to slots in a buffer, (ii) generate motion vectors by motion estimating inter-prediction candidates of a current picture relative to the reference samples in the buffer, (iii) snoop the fetches from the memory to determine if the reference samples fetched for a non-zero motion vector type of the inter-prediction candidates includes the reference samples for a zero motion vector type of the inter-prediction candidates and (iv) avoid duplication of the fetches for the zero motion vector type of the inter-prediction candidates where the snoop determines that the reference samples have already been fetched. The second circuit may be configured to evaluate the reference samples in the buffer based on the motion vectors to select a prediction sample unit made of the reference samples.

18 Claims, 5 Drawing Sheets

INTER-PREDICTION CANDIDATE SELECTION IN A MODE DECISION

This application relates to U.S. Ser. No. 14/745,728, filed Jun. 22, 2015, which is incorporated by reference in its entirety.

FIELD OF THE INVENTION

The present invention relates to video compression generally and, more particularly, to inter-prediction candidate selection in a mode decision.

BACKGROUND OF THE INVENTION

Conventional mode decision evaluations of inter-prediction candidates are limited by a bandwidth available to fetch reference samples from a memory. Therefore, a subset of all possible inter-prediction candidates is commonly evaluated during video compression. For reproducibility of results and for verification purposes, a deterministic technique is typically used to select the inter-prediction candidates to evaluate, independent of external factors that affect runtime behavior.

It would be desirable to implement an inter-prediction candidate selection in a mode decision.

SUMMARY OF THE INVENTION

The present invention concerns an apparatus including a first circuit and a second circuit. The first circuit may be configured to (i) fetch a reference samples from a memory to slots in a buffer, (ii) generate motion vectors by motion estimating inter-prediction candidates of a current picture relative to the reference samples in the buffer, (iii) snoop the fetches from the memory to determine if the reference samples fetched for a non-zero motion vector type of the inter-prediction candidates includes the reference samples for a zero motion vector type of the inter-prediction candidates and (iv) avoid duplication of the fetches for the zero motion vector type of the inter-prediction candidates where the snoop determines that the reference samples have already been fetched. The second circuit may be configured to evaluate the reference samples in the buffer based on the motion vectors to select a prediction sample unit made of the reference samples.

The objects, features and advantages of the present invention include providing inter-prediction candidate selection in a mode decision that may (i) reduce a number of fetches of reference samples, (ii) evaluate a greater number of inter-prediction candidates than common techniques, (iii) apply a credit-based mechanism to limit the number of reference sample accesses, (iv) buffer integer-pel and/or sub-pel motion compensated samples, (v) index a table of components into the buffer, (vi) snoop the fetches and/or (vii) be implemented as part of a digital camera.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Various embodiments of the invention generally provide efficient evaluation of high quality inter-prediction candidates in a mode decision module. The mode decision module may efficiently evaluate a number of high quality inter-prediction candidates with a limited number of fetches of reference samples from a memory (e.g., a frame buffer). The evaluations of the inter-prediction candidates are generally limited by a bandwidth available to fetch the reference samples. The number of high quality inter-prediction candidates that may be evaluated within a set cycle budget using embodiments of the invention is generally greater than in common techniques. The greater number of evaluations may be achieved by a reduction in duplicate fetches of the reference samples, applying an optional credit-based mechanism to limit a number of reference sample accesses in a deterministic fashion, and optionally snooping the fetches to avoid duplication. In some embodiments, the mode decision module may be part of a video compression technique. The video compression technique may be compliant with a High-Efficiency Video Coding (e.g., HEVC) standard H.265 (e.g., International Telecommunication Union-Telecommunications Standard H.265) and/or an Advanced Video Coding (e.g., AVC) standard H.264 (e.g., International Telecommunication Union-Telecommunications Standard H.264). Other video compression standards may be implemented to meet the design criteria of a particular application.

Figure 1:
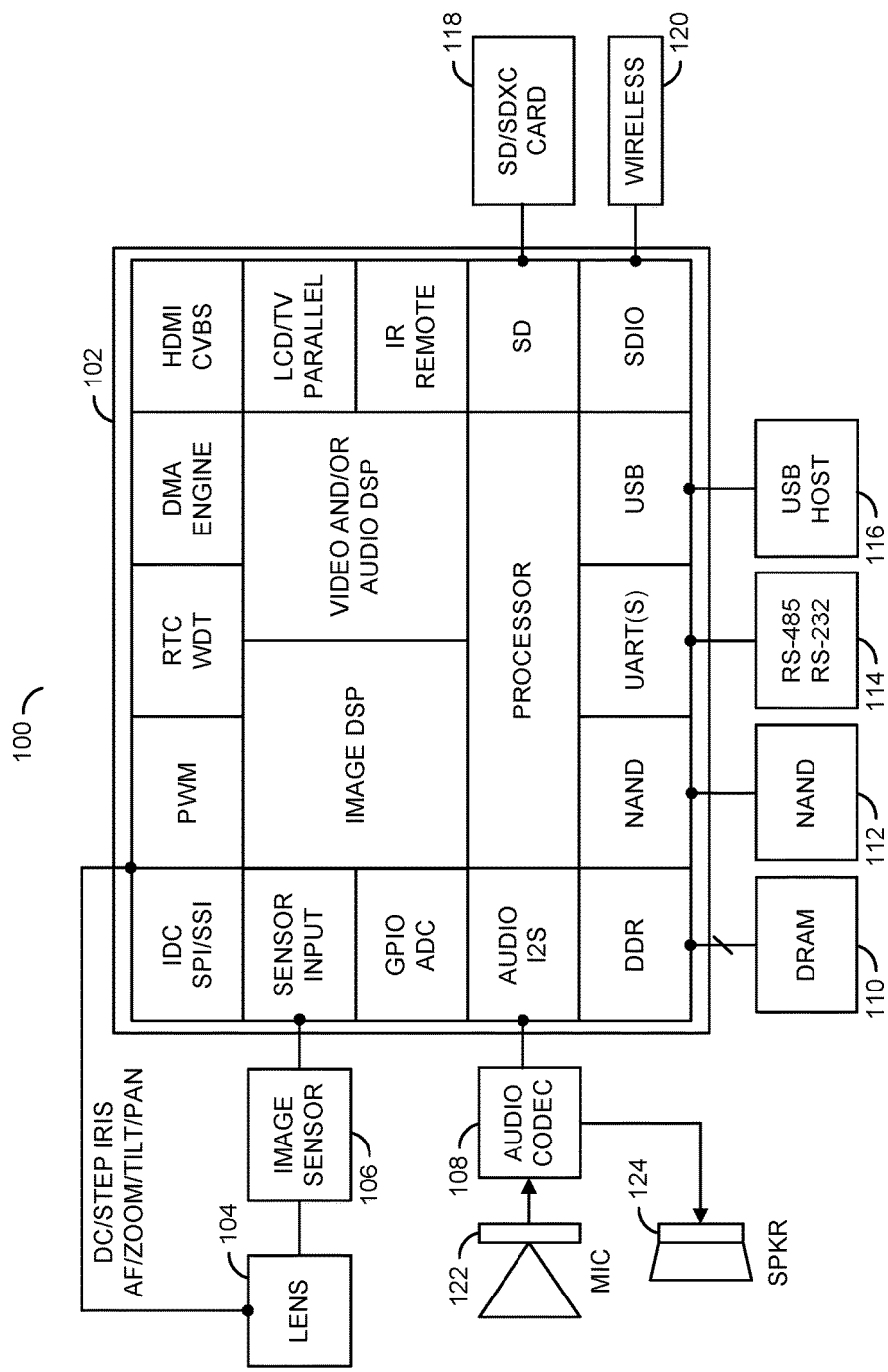
FIG. 1 is a block diagram of a camera system.

Referring to FIG. 1, a block diagram of a camera system 100 is shown illustrating an example implementation of a camera/recorder system (or apparatus). In some embodiments, the camera system 100 may be a digital video camera, a digital still camera or a hybrid digital video/still camera. In an example, the electronics of the camera system 100 may be implemented as one or more integrated circuits. For example, an application specific integrated circuit (e.g., ASIC) or system-on-a-chip (e.g., SOC) may be used to implement a processing portion of the camera system 100. In various embodiments, the camera system 100 may comprise a camera chip (or circuit) 102, a lens assembly 104, an image sensor 106, an audio codec 108, dynamic random access memory (e.g., DRAM) 110, nonvolatile memory (e.g., NAND flash memory, NOR flash memory, etc.) 112, one or more serial interfaces 114, an interface 116 for connecting to or acting as a universal serial bus (e.g., USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an Ethernet cable, or wireless link).

In various embodiments, the circuit 102 may comprise a number of modules (or circuits) including, but not limited to, a pulse width modulation (e.g., PWM) module, a real time clock and watchdog timer (e.g., RTC/WDT), a direct memory access (e.g., DMA) engine, a high-definition multimedia interface (e.g., HDMI), an LCD/TV/Parallel interface, a general purpose input/output (e.g., GPIO) and an analog-to-digital converter (e.g., ADC) module, an infrared (e.g., IR) remote interface, a secure digital input output (e.g., SDIO) interface module, a secure digital (e.g., SD) card interface, an audio inter-IC sound (e.g., I2S) interface, an image sensor input interface, and a synchronous data communications interface (e.g., IDC SPI/SSI). The circuit 102 may also include an embedded processor (e.g., ARM, etc.), an image digital signal processor (e.g., DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (e.g., IEEE) 802.11, IEEE 802.15, IEEE 802.15.1, IEEE 802.15.2, IEEE 802.15.3, IEEE 802.15.4, IEEE 802.15.5, and/or IEEE 802.20. The circuit 102 may also include support for communicating using one or more of the universal serial bus protocols (e.g., USB 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors and encoders of the circuit 102) implementing inter-prediction candidate selection in a mode decision may be stored in one or more of the memories 110 and 112. When executed by the circuit 102, the programming code generally causes one or more processors in the circuit 102 to fetch multiple reference samples from a memory (e.g., the DRAM 110) to multiple slots in a buffer (e.g., buffer 204 in FIG. 3). The programming code may also cause motion estimations of multiple current sample units (e.g., coding tree units, coding units, prediction units, blocks, sub-blocks, partitions, etc.) of a current picture to generate multiple motion vectors. The motion vectors may be stored in several lines of a table. Each line generally identifies a corresponding slot in the buffer. Duplicates among the lines may be consolidated. The reference samples in the buffer may be evaluated based on the motion vectors to select an inter-prediction sample unit. The inter-prediction sample units may be subtracted from a current sample unit being encoded to form residual sample units. One or more winning residual sample units may be transformed, quantized and entropy encoded to create a compressed video signal (or bitstream). The compressed video signal may be presented to the SD/SDXC card 118, and/or the wireless interface 120, and/or the USB interface 116.

Figure 2:
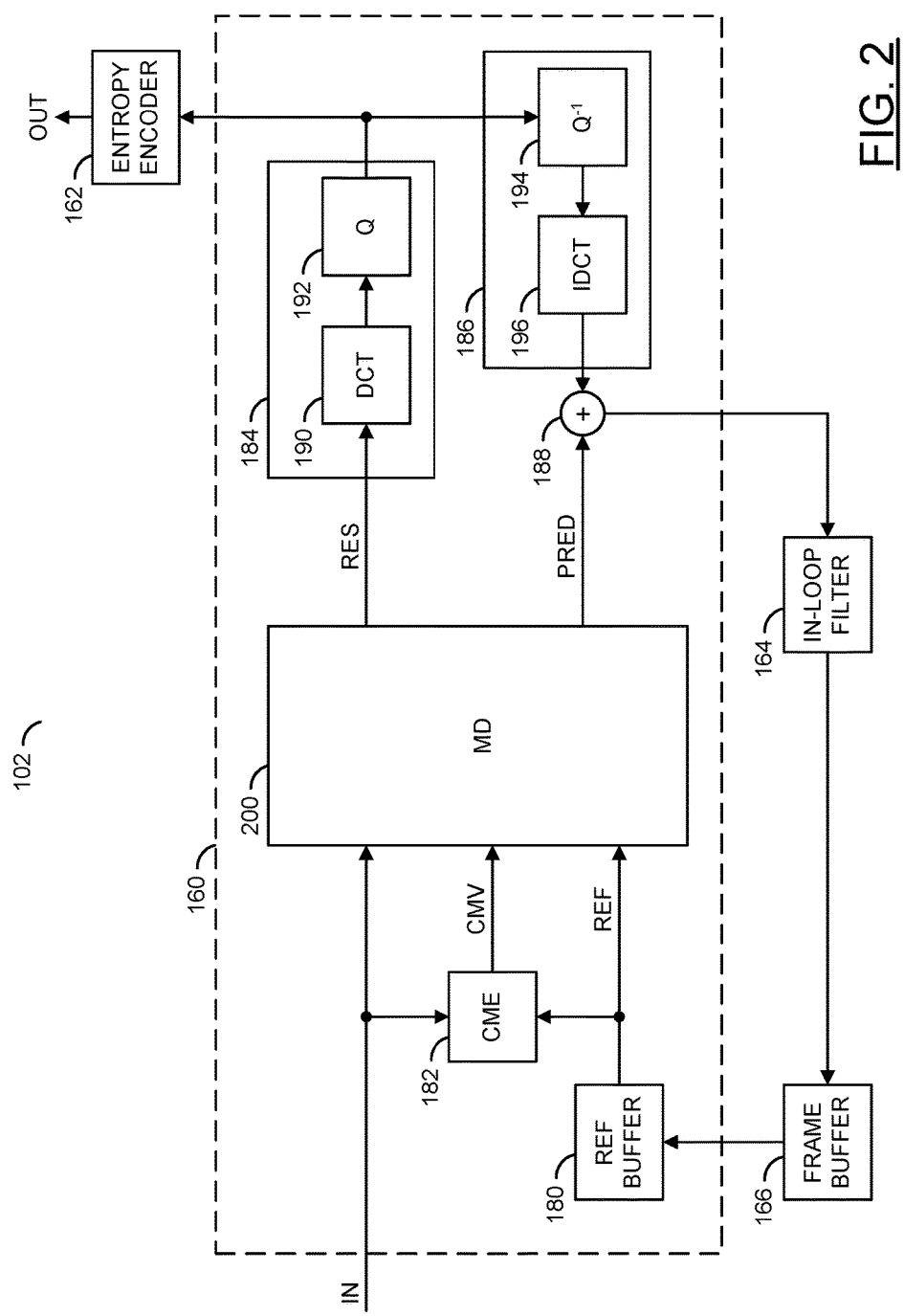
FIG. 2 is a block diagram of a processor circuit.

Referring to FIG. 2, a block diagram of the circuit 102 is shown. The circuit 102 generally comprises a block (or circuit) 160, a block (or circuit) 162, a block (or circuit) 164 and a block (or circuit) 166. The circuits 160-166 may be implemented in hardware, software, firmware or any combination thereof in an apparatus (or circuit or device). The circuit 160 may comprise a block (or circuit) 180, a block (or circuit) 182, a block (or circuit) 184, a block (or circuit) 186, a block (or circuit) 188, a block (or circuit) 190, a block (or circuit) 192, a block (or circuit) 194, a block (or circuit) 196 and a block (or circuit) 200.

A signal (e.g., IN) may be received by the circuit 182 and the circuit 200. The signal IN generally carries digital video. The video generally includes a sequence of pictures (or images, or frames and/or fields). A signal (e.g., OUT) may be generated and presented by the circuit 162. The signal OUT may represent a bitstream of compressed video. A signal (e.g., CMV) may be generated by the circuit 182 and transferred to the circuit 200. The signal CMV may convey coarse motion vectors. The circuit 200 may also receive a signal (e.g., REF) from the circuit 180. The signal REF may carry reference samples. A signal (e.g., RES) may be generated by the circuit 200 and presented to the circuit 184. The signal RES may carry residue sample units. A signal (e.g., PRED) may be generated by the circuit 200 and received by the circuit 188. The signal PRED may convey the inter-prediction sample units and the intra-prediction sample units.

The circuit 160 is shown implementing a compression circuit. The circuit 160 is generally operational to generate coefficients by compressing pictures received in the signal IN based on reference pictures received from the circuit 166. The coefficients may be transferred to the circuit 162. Reconstructed sample units may be presented to the circuit 164

The circuit 162 is shown implementing an entropy encoder. In some embodiments, the entropy encoding technique may be a context-adaptive binary arithmetic coding technique. Other entropy coding techniques may be implemented to meet the criteria of a particular application.

The circuit 164 is shown implementing an in-loop filter. The circuit 164 is generally operational to filter the reconstructed sample units created by the circuit 160 to smooth rough edges. The filtered sample units may be presented to the circuit 166.

The circuit 166 is shown implementing a frame buffer circuit. The circuit 166 may be operational to buffer the reference pictures. The reference pictures may be used by the circuit 160 to compress additional pictures received in the signal IN. In various embodiments, the circuit 166 may be implemented as part of the circuit 110.

The circuit 180 is shown implementing a reference buffer circuit. The buffer 180 may be configured to allow fast access to fetched reference samples (e.g., luminance samples and/or chrominance samples) by the circuit 160. The reference samples may be received from the circuit 166. In various embodiments, the reference samples stored in the circuit 180 may be only a portion of the full reference pictures stored in the circuit 166. The reference samples may be presented in a signal (e.g., REF) to the circuit 182 and the circuit 200.

The circuit 182 is shown implementing a coarse motion estimation (e.g., CME) circuit. The circuit 182 may be operational to compare reference samples with the current samples of a current sample unit of a current picture to estimate motion. The resulting one or more coarse motion vectors may be computed using existing techniques, such as a hierarchical search. The reference samples are generally received in the signal REF. The current samples may be received in the signal IN. The coarse motion vectors may be presented in the signal CMV to the circuit 200.

The circuit 184 is shown implementing a forward path module. In various embodiments, the forward path module 184 comprises the circuit 190 (e.g., a transform module 190) and the circuit 192 (e.g., a quantization module 192). The circuit 184 generally receives residual sample units from the circuit 200 via the signal RES.

The circuit 186 is shown implementing a reverse path module. In various embodiments, the inverse path module 186 comprises the circuit 194 (e.g., an inverse quantization module 194) and the circuit 196 (e.g., an inverse transform module 196). The inverse quantization module 194 is generally configured to perform an inverse operation relative to the quantization module 192. The inverse transform module 196 is generally configured to perform an inverse operation relative to the transform module 190.

The circuit 188 is shown implementing an adder circuit. The circuit 188 may be operational to add the reference samples of a prediction sample unit to a reconstructed residual sample unit to reconstruct the original sample unit of the pictures in the signal IN. The reconstructed sample units may be presented to the circuit 164 for filtering.

The circuit 200 is shown implementing a mode decision circuit. The circuit 200 may be operational to select among multiple modes (e.g., intra-prediction mode or inter-prediction mode), multiple sample unit types (e.g., blocks, sub-blocks, partitions, coding tree units, coding units, prediction units, etc.) and multiple sample unit sizes for compressing the current samples. The current samples may be received in the signal IN. The coarse motion vectors may be received from the circuit 182 in the signal CMV. The reference samples may be received from the circuit 180 in the signal REF. Once a mode decision has been made, the selected residual sample unit may be presented by the circuit 200 in the signal RES. The selected (inter or intra) prediction sample unit used to create the residual sample unit may be presented in the signal PRED.

For the inter-prediction mode, the circuit 200 may generate inter-picture prediction samples by inter-picture estimations or extrapolations from temporally neighboring samples. The inter-prediction task may be divided into reference sample fetches, motion estimations and inter-prediction sample generations. The reference sample fetches may copy a region of the reference samples from one or more of the reference pictures available in the circuit 166. The motion estimations generally find best motion vectors for each potential reference picture using cost metrics, such as a sum of absolute differences (e.g., SAD). The inter-prediction sample generations may generate (optionally weighted) averages of the prediction samples from motion compensated forward reference pictures and/or motion compensated backward reference pictures.

The inter-prediction type candidates may be categorized as unidirectional (e.g., ME) candidates, zero motion vector (e.g., ZMV) candidates, bidirectional (e.g., BIDIR) candidates and zero motion vector difference (e.g., ZMVD) candidates. The unidirectional candidates may have motion vectors obtained by a coarse motion estimation in the circuit 182. The coarse motion vectors may be determined using common techniques, such as a hierarchical search. The coarse motion vectors may be optionally refined within the circuit 200 using one or more iterative refinements down to fractional precision (e.g., half-pel precision and quarter-pel precision).

The zero motion vector candidates are generally unidirectional candidates with a motion of zero in both an x-axis and a y-axis. The bidirectional candidates may be combinations of unidirectional and/or zero motion vector candidates. The motion vectors of the bidirectional candidates may be both forward, both backward, or one in each direction.

The zero motion vector difference candidates may be unidirectional candidates or bidirectional candidates with a motion matching a motion vector predictor (e.g., MVP), such that no additional motion vector differential may be specified. A typical example may be a Skip candidate in the Advanced Video Coding standard H.264 or a Merge candidate in the High Efficiency Video Coding standard H.265.

For the intra-prediction mode, the circuit 200 may generate intra-picture prediction samples by extrapolation from spatially neighboring samples within the same picture. Therefore, no reference samples are generally involved in the intra-prediction. Intra-prediction sample generation may be straightforward, since all intra-prediction candidates generally share a same limited set of operands (e.g., the spatially neighboring samples of the current sample unit). The intra-prediction sample generation tasks may be parallelized to allow evaluation of any number of intra-prediction candidates within a given cycle budget.

In terms of candidate selection, the circuit 200 may select a single winner or multiple winners from the various candidates. The selection may be based on cost metrics, such as a sum of absolute transformed differences (e.g., SATD). Other cost metrics may be implemented to meet the design criteria of a particular application.

Figure 3:
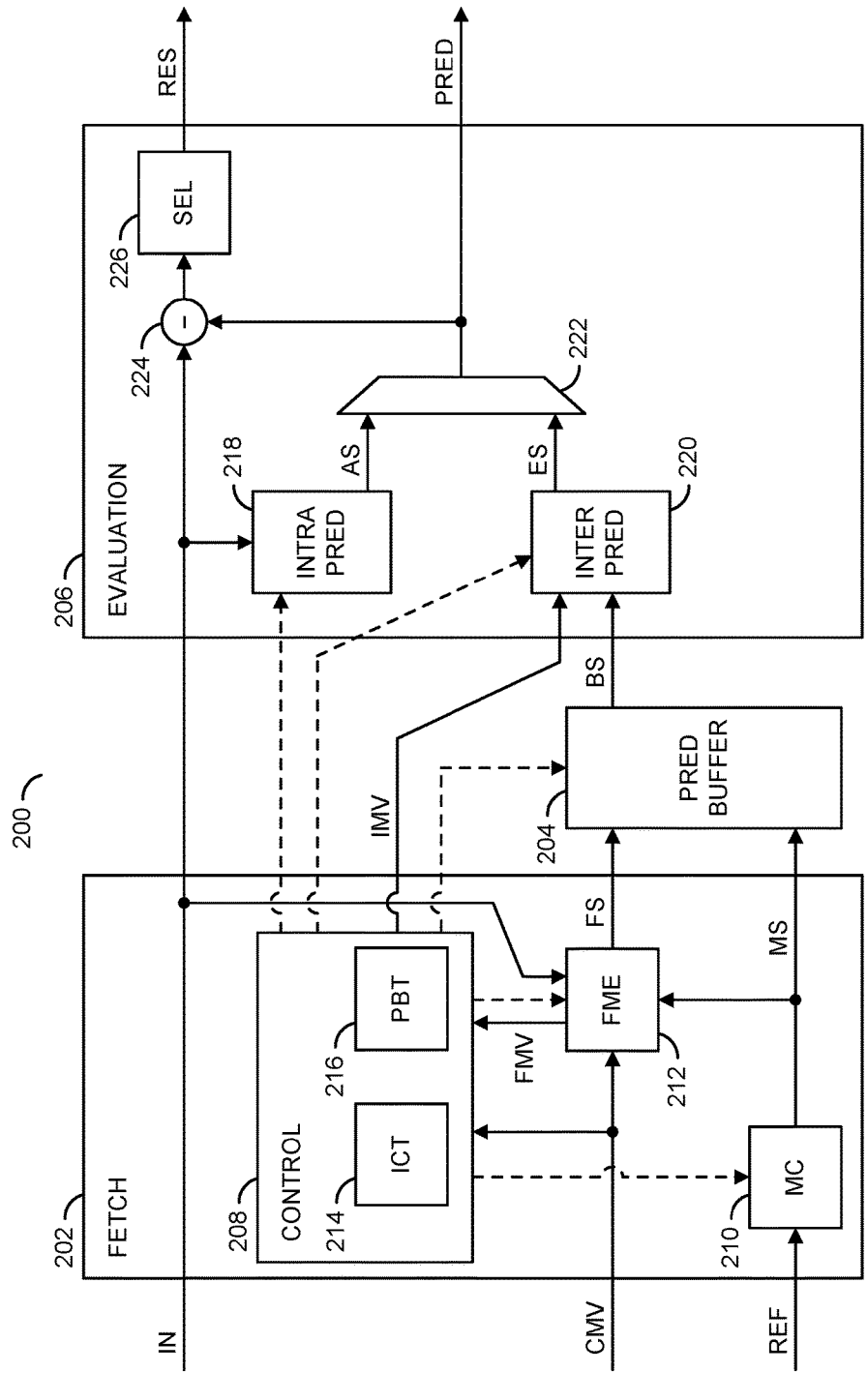
FIG. 3 is a block diagram of a mode decision circuit in accordance with a preferred embodiment of the present invention.

Referring to FIG. 3, a block diagram of an example implementation of the circuit 200 is shown in accordance with a preferred embodiment of the present invention. The circuit 200 generally comprises a block (or circuit) 202, a block (or circuit) 204 and a block (or circuit) 206. The circuit 202 generally comprises a block (or circuit) 208, a block (or circuit) 210 and a block (or circuit) 212. The circuit 208 may comprise a table 214 and a table 216. The circuit 206 generally comprises a block (or circuit) 218, a block (or circuit) 220, a block (or circuit) 222, a block (or circuit) 224 and a block (or circuit) 226.

The signal IN may be received by the circuits 212, 218 and 224. The signal CMV may be received by the circuit 208 and the circuit 212. The signal REF may be received by the circuit 210. The signal RES may be generated by the circuit 226. The signal PRED may be generated by the circuit 222.

A signal (e.g., FMV) may be generated by the circuit 212 and presented to the circuit 208. The signal FMV may convey fine motion vectors. A signal (e.g., FS) may be generated by the circuit 212 and presented to the circuit 204. The signal FS may carry interpolated reference samples generated as part of the fine motion estimation. A signal (e.g., MS) may be generated by the circuit 210 and presented to the circuit 204. The signal MS may carry reference samples generated during the motion compensation. A signal (e.g., IMV) may be generated by the circuit 208 and presented to the circuit 220. The signal IMV may carry internal motion vectors stored in the circuit 208.

A signal (e.g., BS) may be generated by the circuit 204 and transferred to the circuit 220. The signal BS may transfer buffered reference samples. A signal (e.g., AS) may be generated by the circuit 218 and presented to the circuit 222. The signal AS may convey prediction samples generated by the intra-prediction circuit 218. A signal (e.g., ES) may be generated by the circuit 220 and presented to the circuit 222. The signal ES may convey prediction samples generated by the inter-prediction circuit 220.

A performance of the inter-prediction sample generation may be limited by a bandwidth available to fetch the reference samples. The bandwidth limit generally restricts a maximum number of high-quality inter-prediction candidates that may be evaluated within a given cycle budget. Therefore, the circuit 200 may decouple the task of fetching the reference samples for the inter-prediction candidates (e.g., the circuit 202) from the evaluation of the inter-prediction candidates (e.g., the circuit 206).

The circuit 202 is shown implementing a fetch circuit. The circuit 202 is generally operational to fetch the reference samples via the signal REF. The forward component and/or backward component of all inter-prediction candidates may be fetched and processed separately. Inter-prediction candidates, corresponding components and metadata may be generated by and stored internal to the circuit 202. The corresponding fetched and processed reference samples may be stored in the circuit 204.

The circuit 204 is shown implementing a prediction buffer circuit. The circuit 204 is generally divided into multiple slots. Each slot may be of sufficient size to store the reference samples for a component of one or more inter-prediction candidates. The reference samples may be received from the circuit 210 via the signal MS and/or from the circuit 212 via the signal FS. When read, the circuit 204 generally presents the buffered reference samples from the requested (or indexed) slot in the signal BS.

The circuit 206 is shown implementing an evaluation circuit. The circuit 206 may be operational to evaluate the inter-prediction candidates and the intra-prediction candidates to efficiently compress a current sample unit received in the signal IN. The selected (or winning) prediction sample unit may be presented in the signal PRED. The resulting residual sample unit may be presented in the signal RES.

The circuit 208 is shown implementing a control circuit. The circuit 208 is generally operational to control the overall mode decision tasks performed in the circuit 200. Control communications between the circuit 208 and the other circuits are generally illustrated as dashed lines.

The circuit 210 is shown implementing a motion compensation (e.g., MC) circuit. The circuit 210 is generally operational to apply a motion compensation, with optional weighted prediction to the reference samples received in the signal REF. The motion compensated samples may be presented in the signal MS.

The circuit 212 is shown implementing a fine motion estimation (e.g., FME) circuit. The circuit 212 is generally operational to refine the coarse motion vectors received in the signal CMV. The refinement may be based on reference samples received from the circuit 210 via the signal MS. The refined motion vectors (e.g., generated at a finer pel resolution) may be presented in the signal FMV to the circuit 208 for storage in the table 216. The motion-compensated and weighted reference samples of all inter-prediction components may be stored in the slots of the circuit 204, a single slot per unique component.

The table 214 is shown implementing an inter candidate table (e.g., ICT). The table 214 may store multiple inter-prediction candidates simultaneously for one or more current sample units (e.g., a coding tree unit and multiple coding units/prediction units). Each line of the table 214 may include a direction of the inter-prediction (e.g., forward, backward or bidirectional), a slot number identifying one or more (e.g., up to two) slots in the circuit 204, and metadata that identifies what type of inter-prediction candidate (e.g., ME, BIDIR, ZVM or ZVMD) is stored on the line.

The table 216 is shown implementing a prediction buffer table (e.g., PBT). The table 216 may simultaneously store multiple components of the inter-prediction candidates. Since the bidirectional type of inter-prediction candidates may have both a forward component and a backward component, each bidirectional candidate in the table 214 generally corresponds to multiple component lines in the table 216. Each line of the table 216 may include a direction of the component, a reference picture number the component is using, an X-axis component of a motion vector (e.g., MV.X) of the component, a Y-axis component of the motion vector (e.g., MV.Y) and a slot number of a corresponding slot in the circuit 204.

The circuit 218 is shown implementing an intra prediction circuit. The circuit 218 is generally operational to create multiple intra-predicted sample units from the current sample unit in the signal IN undergoing mode selection. The various intra-prediction sample units may be presented in the signal AS to the circuit 222.

The circuit 220 is shown implementing an inter prediction circuit. The circuit 220 is generally operational to create multiple inter-prediction reference sample units from the reference samples stored in the circuit 204. The reference sample units may be based, in part, on the motion vectors received from the circuit 208 via the signal IMV. The resulting reference sample units may be presented to the circuit 222 in the signal ES.

The circuit 222 is shown implementing a multiplexer circuit. The circuit 222 is generally operational to multiplex the signal AS and the signal ES to the circuit PRED. The signal PRED may be transferred to the circuit 224 and the circuit 188 (FIG. 2).

The circuit 224 is shown implementing a subtraction circuit. The circuit 224 is generally operational to generate a residual sample unit by subtracting a prediction sample unit in the signal PRED from a current sample unit in the signal IN. The resulting residual sample unit may be transferred to the circuit 226 for evaluation.

The circuit 226 is shown implementing a selection circuit. The circuit 226 is generally operational to calculate a score for each of the residual sample units received from the circuit 224. The residual sample units may be ranked based on the scores and a top N may be selected as the winner(s), where N is an integer of one or greater. The winning residual sample units may be presented in the signal RES to the forward path 184 (FIG. 2) for transformation and quantization.

The inter-prediction candidates may be processed sequentially. For each component of each inter-prediction candidate, a slot is generally selected in the circuit 204. The slot may be recorded in the table 216, indexed by the direction (e.g., forward or backward), reference picture identifier (e.g., picture number or ref idx) and the motion vector components (e.g., MV.X and MV.Y). The circuit 204 with the table 216 generally act as a cache. When a new component is processed, if the new component has (i) a matching direction, (ii) a matching reference picture number and (iii) a similar motion vector of an already-processed component present in the table 216, the corresponding slot in the circuit 204 may be reused and no new reference samples may be fetched to the circuit 204. The new component may be consolidated with the duplicate existing component.

The inter-prediction candidates may be recorded in the table 214. Once the appropriate reference samples for an inter-prediction candidate are available in the circuit 204, one or more cost metrics of that inter-prediction candidate may be calculated by the circuit 206. In case of bidirectional candidates, the forward component and the backward component may be stored separately in the circuit 204. The bidirectional prediction samples may be calculated as an arithmetic average of the forward component and the backward component.

A credit mechanism may optionally be applied that deterministically limits a number of reference sample fetches to stay within a given cycle budget. For each component of a fetched inter-prediction candidate, a portion of the credit may be consumed. Once all fetch credits have been exhausted, no more reference samples for additional candidates of that inter-prediction candidate may be fetched. If a component is already present in the table 216, the corresponding reference samples may already be buffered in the circuit 204. Therefore, no additional reference samples may be fetched in such a situation and no credit may be consumed.

Since the motion vector of a fetched candidate may often be near zero, and since additional references samples are generally fetched to facilitate the motion compensation (e.g., 3 extra samples in the X-direction and in the Y-direction for 4-tap motion compensation), reference samples for the ZMV candidates may often be obtained as part of the fetch for a non-ZMV candidate. Determining if the ZMV candidate reference samples are part of a fetch of the non-ZMV candidate reference sample fetch is generally called snooping. If a ZMV candidate is snooped during a non-ZMV candidate related fetch, no extra credit may be consumed for that ZMV candidate. Likewise, if the reference samples for a component of a ZMVD candidate are contained in the reference samples fetched for an ME candidate, that ZMVD component may also be snooped during the ME fetch. Therefore, no credit may be consumed for the ZMVD component.

Figure 4:
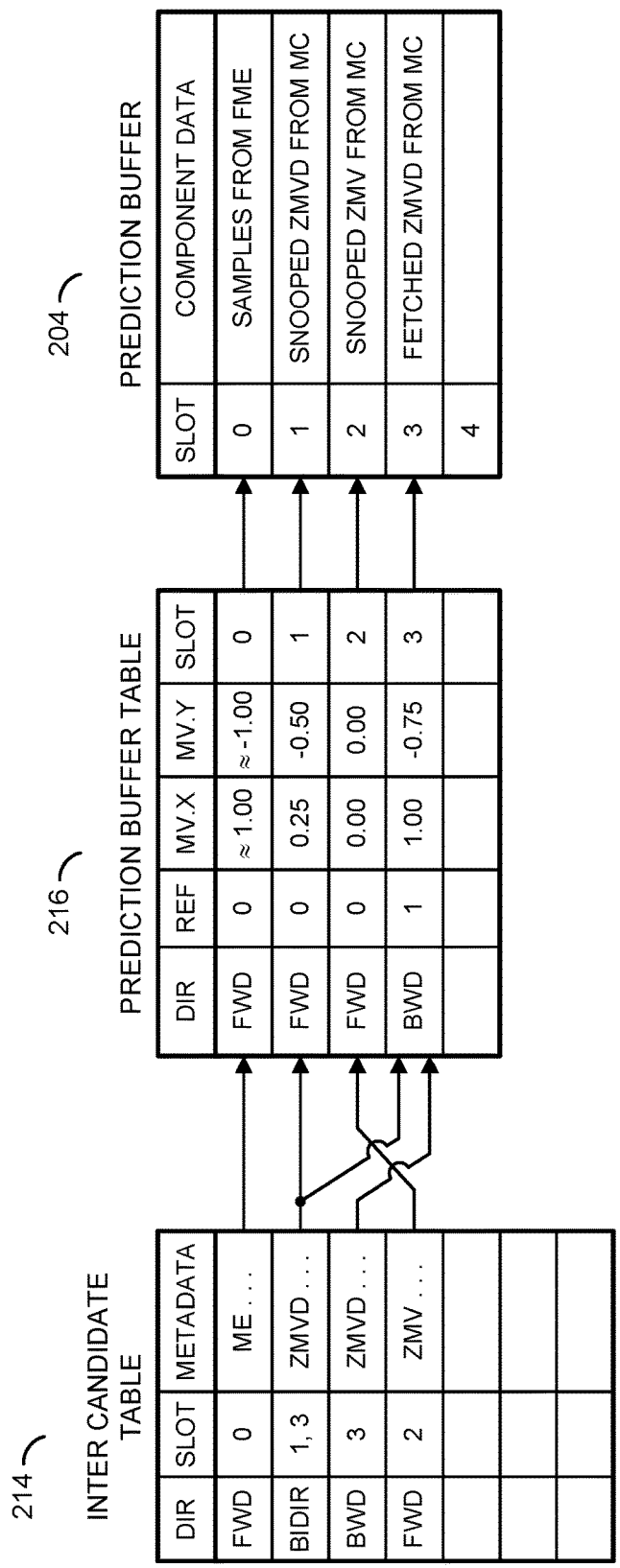
FIG. 4 is a diagram of an example processing of multiple inter-prediction candidates.

Referring to FIG. 4, a diagram of an example processing of multiple inter-prediction candidates is shown. The table 214, the table 216 and the buffer circuit 204 are generally illustrated in the example. Consider the following example with multiple (e.g., 4) inter-prediction candidates in the table 214, multiple (e.g., 5) components in the table 216 and multiple (e.g., 5) slots indexed in the circuit 204.

Inter-prediction candidate 1 may be a forward (e.g., FWD) unidirectional (e.g., ME) type candidate with a coarse motion vector of ($\approx$1.00, $\approx$1.00) from a reference picture 0.

Inter-prediction candidate 2 may be a bidirectional (e.g., BIDIR) zero motion vector difference (e.g., ZMVD) type candidate with a forward motion vector of (0.25, −0.50) from the reference picture 0 and a backward motion vector of (1.00, −0.75) from a reference picture 1.

Inter-prediction candidate 3 may be a backward (e.g., BWD) zero motion vector difference (e.g., ZMVD) type candidate with a backward motion vector of (1.00, −0.75) from the reference picture 1.

Inter-prediction candidate 4 may be a forward (e.g., FWD) zero motion vector (e.g., ZMV) type candidate from the reference picture 0.

Figure 5:
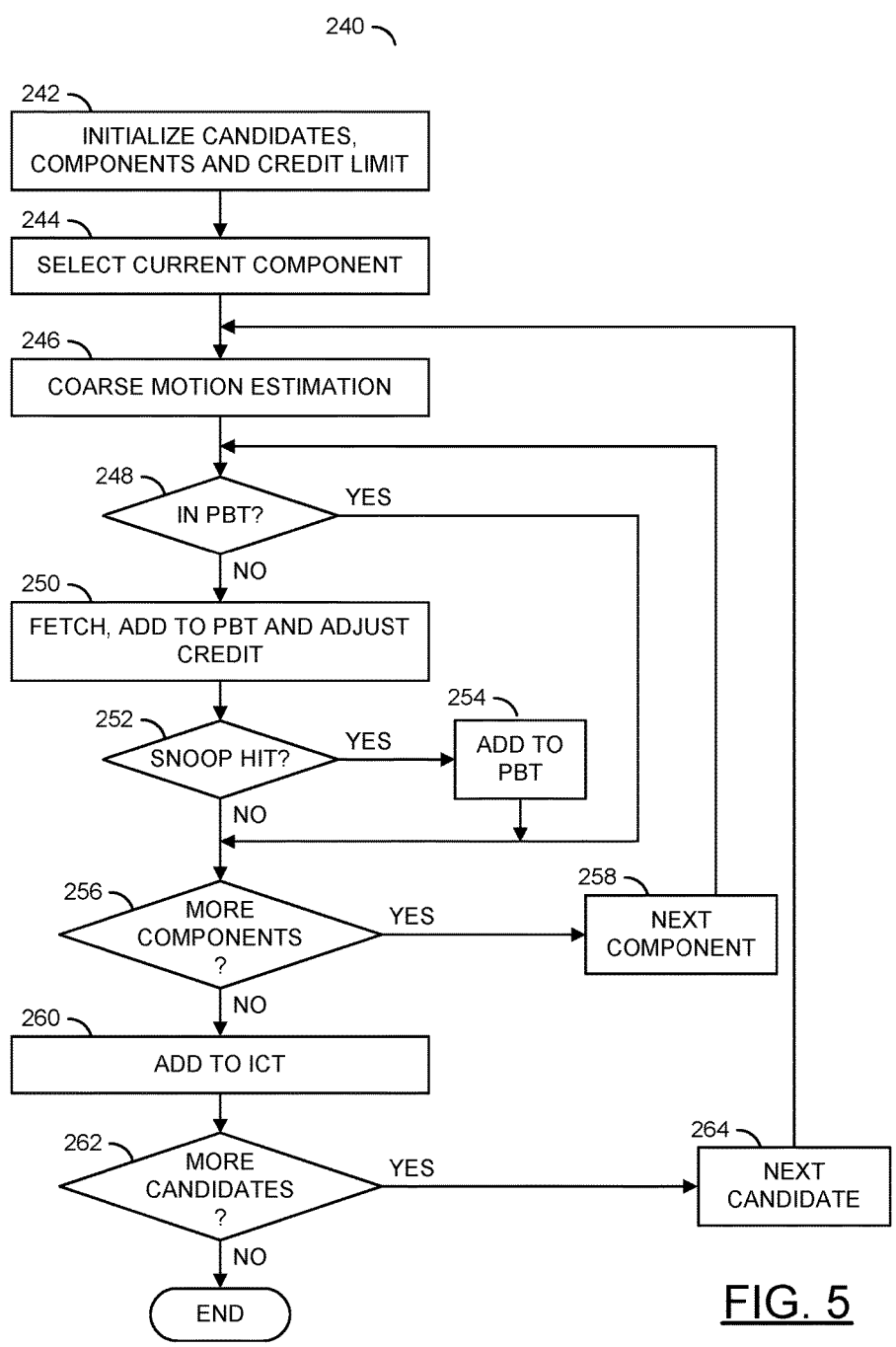
FIG. 5 is a flow diagram for inter-prediction candidate selection.

Referring to FIG. 5, a flow diagram of an example method 240 for inter-prediction candidate selection is shown. The method (or process) 240 is generally performed by the circuits 180, 182 and 200. The method 240 generally comprises a step (or state) 242, a step (or state) 244, a step (or state) 246, a decision step (or state) 248, a step (or state) 250, a decision step (or state) 252, a step (or state) 254, a decision step (or state) 256, a step (or state) 258, a step (or state) 260, a decision step (or state) 262 and a step (or state) 264. The steps 242-264 may be implemented in hardware, software, firmware or any combination thereof in an apparatus (or circuit or device). The sequence of the steps is shown as a representative example. Other step orders may be implemented to meet the criteria of a particular application.

Consider the example illustrated in FIG. 4. In various embodiments, the control circuit 208 generally iterates, in order, over all of the unidirectional ME candidates, the ZMVD candidates and the ZMV candidates. Other candidate orders may be implemented to meet the design criteria of a particular application. The table 214 and the table 216 may be maintained in the control circuit 208.

For each candidate, the forward component and the backward component may be processed separately. If a component of a matching direction (e.g., forward or backward), similar motion vector, and matching reference picture is present in the table 216, the corresponding slots in the table 216 and the circuit 204 may be reused. Otherwise, an entry is generally added to the table 216 and the circuit 208 instructs the circuit 210 to fetch the reference samples for the just-added component. For each candidate processed, an entry may be added to the table 214.

In the step 242, the inter-prediction candidates, components and credit limits may be initialized for a current sample unit (or block) of a current picture under consideration. The inter-prediction candidate 1 (e.g., forward-only ME candidate 1) may be selected for initial processing in the step 244. In various situations, coarse motion estimation of the current sample unit may be performed in the step 246. In other situations, the coarse motion estimation may be performed ahead of time and retrieved during an execution of the method 240. A check may be performed in the decision step 248 to determine if the current component is already in the table 216.

Since the current component is an initial component being considered, step 250 may reserve a slot 0 in the table 216 for the reference samples from the fine motion estimation result, and the credit may be reduced due to a fetch. The final motion vector is generally not known at the time that the fetch is initiated, since a coarse motion vector (e.g., ($\approx$1.00, $\approx$1.00)) may be further refined by the circuit 212. However, the initial coarse motion vector is generally close enough to other motion vectors (e.g., the ZMVD candidate 2 motion vector (0.25, −0.50)) to snoop for forward components of other candidates.

In general, if the fetched region for a component of an ME candidate or a ZMVD candidate contains a ZMV candidate that may be processed later, the circuit 208 may instruct the circuit 210 to also snoop the ZMV candidate. If the snoop is successful, a corresponding entry for the snooped ZMV candidate may be added to the table 216. The ZMV candidate itself may not yet be added to the table 214. The ZMV candidate entry generally happens when the ZMV candidate is processed by the circuit 208.

Furthermore, if the fetched region for a component of an ME candidate contains a component of a ZMVD candidate that may be processed later, the circuit 208 may instruct the circuit 210 to snoop the component of the ZMVD candidate. If the snoop is successful, a corresponding entry for the snooped component of the ZMVD candidate may be added to the table 216. The ZMVD candidate itself may not yet be added to the table 214. The ZMVD candidate entry into the table 214 generally happens when the ZMVD candidate is processed by the circuit 208.

As part of the fetch, the circuit 210 may perform a weighted prediction and/or fractional motion vector interpolation. For the ME candidates, the interpolated samples may be sent to the circuit 212 for iterative fractional motion vector refinement to select a final motion vector. The resulting reference samples may be sent to the buffer circuit 204 for storage. For components of the ZMVD candidates and the ZMV candidates, the circuit 210 may send the interpolated reference samples directly to the buffer circuit 204. Due to an added latency of the fine motion estimation operation, the reference samples may not arrive at the buffer circuit 204 in the same order as fetched by the circuit 210.

Returning to the example, the snoop of a forward component of the bidirectional ZMVD candidate 2 in the step 252 may add the forward component of the ZMVD candidate 2 to slot 1 of the circuit 216 in the step 254. The initial coarse motion vector may also by close enough to a motion vector (0, 0) to snoop the ZMV candidate 4 per the step 252 to slot 2 of the table 216 in the step 254. Since the ME candidate 1 has no additional components per the decision step 256, the ME candidate 1 may be added to the table 214 in the step 260. A check may be performed in the step 262 for more inter-prediction candidates to process. With three additional inter-prediction candidates to consider in the example, the method 240 may proceed to the next candidate in the step 264 and return to the coarse motion estimation in the step 246.

The inter-prediction candidate 2 (e.g., the bidirectional ZMVD candidate 2) may be processed next. The bidirectional ZMVD candidate 2 may have a forward motion vector of (0.25, −0.50) and a backward motion vector of (1.00, −0.75). The reference samples for the forward component of the bidirectional ZMVD candidate 2 may have already been snooped to slot 1 of the circuit 204 during the fetch of the same reference samples for the ME candidate 1. Therefore, no additional reference sample fetch may be initiated for the forward component. The backward component generally does not match any entries in the table 216 per the step 248. Therefore in step 250, a new fetch may be initiated, an entry with slot 3 is added to the table 216 and the credit is reduced. The bidirectional ZMVD candidate 2 may also be added to the table 214 in the step 260. The method 240 may follow the loop around the steps 262, 264 and 246 to consider the next inter-prediction candidate.

The inter-prediction candidate 3 (e.g., the backward-only ZMVD candidate 3) may be processed next. Since the backward component of the ZMD candidate 3 may already be present in the table 216 (e.g., same as the backward component of the ZMVD candidate 2) per the decision step 248, no additional fetch may be initiated. The ZMVD candidate 3 may be added to the table 214 in the step 260.

The inter-prediction candidate 4 (e.g., the ZMV candidate 4) may be processed next. Since the forward component is already snooped to slot 2 (e.g., during the fetch for the forward component of the candidate 1), the step 250 is bypassed and no entry may be added to the table 216. The ZMV candidate 4 may be subsequently added to the table 214 in the step 260. Since the ZMV candidate 4 may be a last candidate in the example, the method 240 ends. In total, two fetches may be issued by the motion control (e.g., slot 3) and the fine motion estimation (e.g., slot 0) and thus two credits were consumed. A total of four candidates with a total of 5 components (of which 4 are unique) were generally evaluated.

Once the reference samples for the unidirectional candidates or bidirectional candidates are collected in the circuit 204, the circuit 208 may instruct the inter prediction circuit 220 to generate final prediction samples for the inter-prediction candidates in the signal ES. Since the buffer circuit 204 holds unidirectional motion compensated and weighted reference samples, the circuit 220 may read out the reference samples for unidirectional candidates, or perform an arithmetic average for bidirectional candidates.

The circuit 208 may also instruct the intra prediction circuit 218 to generate prediction samples for the intra-prediction candidates. The circuit 218 may present the prediction samples in the signal AS. The circuit 200 generally evaluates all candidates by subtracting the prediction samples from the target input in the circuit 224 to create residual sample units. The circuit 226 may calculate a score for each residual sample unit based on a metric (e.g., a sum of absolute transformed differences). The sum of absolute transformed difference scores may be ranked and a top N candidates with the best scores may be selected as the winner(s) by the circuit 226.

In various embodiments, the circuit 102 generally reduces fetching of duplicate reference samples by buffering intermediate results in a format that allows quick evaluation. A table-based record-keeping mechanism may be applied to avoid duplicate fetching for multiple candidates. A snoop mechanism may be used to snoop the inter-prediction candidates and so further reduce the number of reference fetches. A credit-based mechanism may be used to limit the number of reference accesses in a deterministic fashion and maximize the number of high-quality candidates that may be evaluated within a set cycle budget.

The functions and structures illustrated in the diagrams of FIGS. 1-5 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first circuit configured to (i) fetch a plurality of reference samples from a memory to a plurality of slots in a buffer, (ii) generate a plurality of motion vectors by motion estimating a plurality of inter-prediction candidates of a current picture relative to said reference samples in said buffer, (iii) snoop said fetches from said memory to determine during said fetches if said reference samples being fetched for a non-zero motion vector type of said inter-prediction candidates includes said reference samples for a zero motion vector type of said inter-prediction candidates and (iv) avoid duplication of said fetches for said zero motion vector type of said inter-prediction candidates where said snoop determines that said reference samples have already been fetched; and
a second circuit configured to generate a prediction sample unit by evaluating said reference samples in said buffer based on said motion vectors, wherein said prediction sample unit is generated from said reference samples in said buffer.

2. The apparatus according to claim 1, wherein said prediction sample unit represents a winning candidate of a mode decision in a video compression.

3. The apparatus according to claim 1, wherein (i) each of said inter-prediction candidates comprises a plurality of components, (ii) each of said components comprises a direction and a number of a reference picture and (iii) said reference samples are fetched in response to said components.

4. The apparatus according to claim 1, further comprising a table having a plurality of lines configured to store information, wherein said information (i) identifies up to two of said slots in said buffer, (ii) indicates an inter-picture prediction direction and (iii) indicates a candidate type.

5. The apparatus according to claim 1, where each of said inter-prediction candidates comprise one of (i) a unidirectional candidate, (ii) a zero motion vector candidate, (iii) a bidirectional candidate and (iv) a zero motion vector difference candidate that matches a motion vector predictor.

6. The apparatus according to claim 1, wherein said first circuit is further configured to (i) allocate a credit to a given one of said inter-prediction candidates, (ii) consume a portion of said credit where said reference samples are fetched from said memory in response to a component of said given inter-prediction candidate and (iii) stop additional fetches of said reference samples for said given inter-prediction candidate once said credit is exhausted.

7. The apparatus according to claim 6, wherein said credit of said given inter-prediction candidate is not consumed where said reference samples for said component have already been fetched.

8. The apparatus according to claim 1, wherein a credit allocated to said zero motion vector type of said inter-prediction candidate is not consumed where said reference samples of said zero motion vector type of said inter-prediction candidate are part of an earlier fetch of said non-zero motion vector type of said inter-prediction candidates.

9. The apparatus according to claim 1, wherein said first circuit and said second circuit are part of a digital camera.

10. A method for inter-prediction candidate selection in a mode decision, comprising the steps of:
fetching a plurality of reference samples from a memory to a plurality of slots in a buffer;
generating a plurality of motion vectors by motion estimating a plurality of inter-prediction candidates of a current picture relative to said reference samples in said buffer;
snooping said fetches from said memory to determine during said fetches if said reference samples being fetched for a non-zero motion vector type of said inter-prediction candidates includes said reference samples for a zero motion vector type of said inter-prediction candidates;
avoiding duplication of said fetches for said zero motion vector type of said inter-prediction candidates where said snoop determines that said reference samples have already been fetched; and
generating a prediction sample unit by evaluating said reference samples in said buffer based on said motion vectors, wherein said prediction sample unit is generated with a circuit from said reference samples in said buffer.

11. The method according to claim 10, wherein said prediction sample unit represents a winning candidate of a mode decision in a video compression.

12. The method according to claim 10, wherein (i) each of said inter-prediction candidates comprises a plurality of components, (ii) each of said components comprises a direction and a number of a reference picture and (iii) said reference samples are fetched in response to said components.

13. The method according to claim 10, further comprising the step of:
storing information in a table having a plurality of lines, wherein said information (a) identifies up to two of said slots in said buffer, (b) indicates an inter-picture prediction direction and (c) indicates a candidate type.

14. The method according to claim 10, where each of said inter-prediction candidates comprise one of (i) a unidirectional candidate, (ii) a zero motion vector candidate, (iii) a bidirectional candidate and (iv) a zero motion vector difference candidate that matches a motion vector predictor.

15. The method according to claim 10, further comprising the steps of:
allocating a credit to a given one of said inter-prediction candidates;
consuming a portion of said credit where said reference samples are fetched from said memory in response to a component of said given inter-prediction candidate; and
stopping additional fetches of said reference samples for said given inter-prediction candidate once said credit is exhausted.

16. The method according to claim 15, wherein said credit of said given inter-prediction candidate is not consumed where said reference samples for said component have already been fetched.

17. The method according to claim 10, wherein a credit allocated to said zero motion vector type of said inter-prediction candidate is not consumed where said reference samples of said zero motion vector type of said inter-prediction candidate are part of an earlier fetch of said non-zero motion vector type of said inter-prediction candidates.

18. The method according to claim 10, wherein the steps are performed in a digital camera.

* * * * *